United States Patent
Che et al.

(10) Patent No.: US 11,051,305 B1
(45) Date of Patent: Jun. 29, 2021

(54) COMMUNICATION DEVICE HAVING CONCURRENT CARRIER CONFIGURATION AND ESIM PROFILE INSTALLATION

(71) Applicant: MOTOROLA MOBILITY LLC, Chicago, IL (US)

(72) Inventors: Wenlong Che, Naperville, IL (US); Weihua Chen, Naperville, IL (US); Yue Wang, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/805,724

(22) Filed: Feb. 29, 2020

(51) Int. Cl.
*H04W 72/04* (2009.01)
*H04W 8/22* (2009.01)

(52) U.S. Cl.
CPC ......... *H04W 72/0453* (2013.01); *H04W 8/22* (2013.01)

(58) Field of Classification Search
CPC ............................ H04W 72/0453; H04W 8/22
See application file for complete search history.

(56) References Cited

U.S. PATENT DOCUMENTS

2021/0084467 A1\* 3/2021 Roy ..................... H04W 4/20

\* cited by examiner

*Primary Examiner* — Joseph E Dean, Jr.
(74) *Attorney, Agent, or Firm* — Isidore PLLC

(57) ABSTRACT

A communication device, method and computer program product support concurrently receiving an embedded subscriber identity module (eSIM) profile and non-eSIM digital content from separate servers to enable service from a selected carrier. The communication device receives carrier destination data via one of a user interface device, an image capturing device, a removable data storage device, and a network interface of a communication device. The communication device requests download of the eSIM profile associated with a selected carrier from a subscription or carrier server based on the identified carrier destination. While receiving and installing the eSIM profile in an eSIM, the communication device concurrently receives, via the network interface, digital content associated with the selected carrier and a configuration of the communication device from a configuration manager hosted on a configuration server. The digital content enables functionality via the selected carrier.

20 Claims, 5 Drawing Sheets

COMMUNICATION DEVICE HAVING CONCURRENT CARRIER CONFIGURATION AND ESIM PROFILE INSTALLATION

TECHNICAL FIELD

The present disclosure relates generally to communication devices that use an embedded subscriber identity module (eSIM) for carrier cellular services, and in particular to communication devices with an eSIM that is remotely configurable with non-eSIM digital content to support carrier cellular services.

DESCRIPTION OF THE RELATED ART

A subscriber identity module (SIM), widely known as a "SIM card", is an integrated circuit that is intended to securely store an international mobile subscriber identity (IMSI) number and a related key, which are used to identify and authenticate subscribers on mobile telephony devices (such as mobile phones and computers). An embedded-SIM (eSIM) or embedded universal integrated circuit card (eUICC) is a form of programmable SIM card that is embedded directly into a device. Embedding the eSIM in the device eliminates the need to change the SIM card to select a carrier for cellular services and removes a requirement for a connector, thus improving reliability and security of the device.

Two data configuration parts are needed for a communication device to fully use cellular service on a new carrier network. One part is SIM related, being stored on the eSIM as an eSIM profile. End users can add or remove operators or carriers without the need to physically swap a SIM from the communication device by downloading and activating an eSIM profile associated with a selected carrier. Downloading and installing the eSIM profile generally requires 30 seconds to two minutes to complete. The second data configuration part for the communication device to use cellular service on the new carrier network is non-eSIM digital content. An original equipment management (OEM) tailors the digital content for a particular hardware and software operating platform of the communication device. Support for the new carrier requires software flashing or software updating via an over the air (OTA) process with a subsequent reboot of the communication device. Enabling or switching a carrier for cellular service is time consuming, inconvenient, and may not be possible for certain kinds of communication devices such as machine-to-machine (M2M) devices that are deployed as part of an Internet of Things (IoT) solution.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
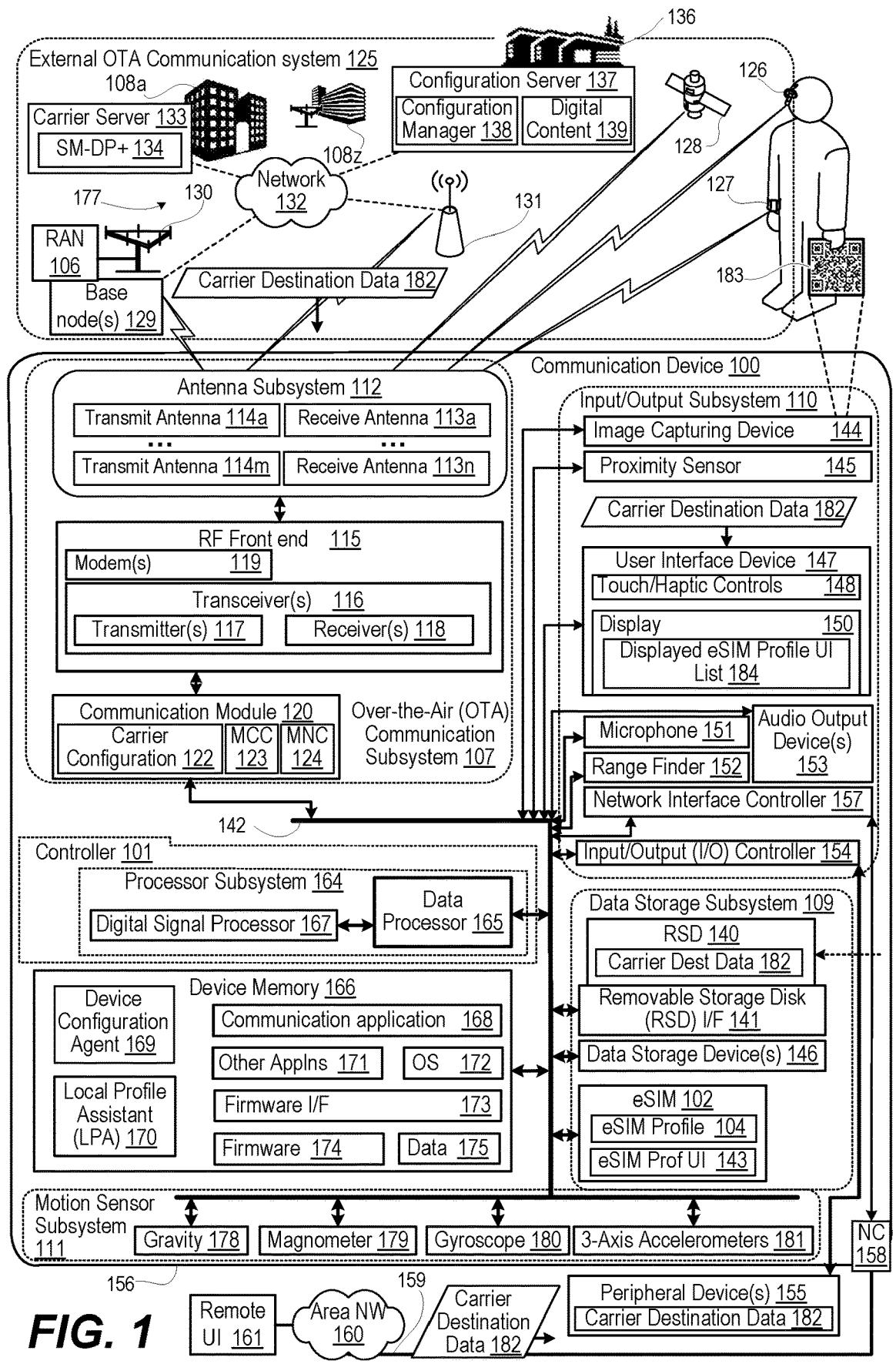
FIG. 1 is a functional block diagram of a communication device that non-sequentially updates an embedded subscriber identity module (eSIM) profile and non-eSIM digital content in support of cellular services from a selected carrier, according to one or more embodiments.

According to aspects of the present disclosure, a communication device, a method, and a computer program product support at least partially concurrent implementation of an embedded subscriber identity module (eSIM) profile and non-eSIM device-specific digital content. The implementation supports communication by the communication device via a new carrier. The at least partially concurrent implementation includes respective downloading and installing of the eSIM profile in an eSIM and the non-ESIM device-specific digital content in device memory of the communication device. The communication device includes a radio frequency (RF) frontend that is configurable for over the air (OTA) communication with at least one radio access network (RAN) operated by a selected carrier from among more than one carrier. The communication device includes the eSIM that stores one or more eSIM profiles. The eSIM profile enables the RF frontend to communicate with the at least one RAN operated by the selected carrier. The communication device includes the device memory that stores a local profile assistant (LPA) application. The communication device includes a network interface that communicates with one or more network servers via wireless communication. A controller of the communication device is communicatively coupled to the RF frontend, the eSIM, the memory, and the network interface. The controller executes the LPA application to enable the communication device to receive, via a selected one of: (i) a user interface device; (ii) an image capturing device; (iii) a removable data storage device; and (iv) the network interface, carrier destination data providing a carrier designation. In response to receiving the carrier destination data, the communication device identifies the selected carrier based on the carrier destination data. Each carrier of the more than one carrier is identified via separate carrier designation data. The communication device requests a download, via the network interface, of an eSIM profile associated with the selected carrier from a subscription server, based on the identified carrier destination. The communication device receives the eSIM profile via the network interface. The communication device installs the eSIM profile in the eSIM. Concurrent with one or more of requesting, receiving and installing the eSIM profile, the controller executes the LPA application to enable the communication device to receive, via the network interface, the digital content associated with the selected carrier and a configuration of the communication device from a configuration manager hosted on a configuration server. The digital content enables functionality via the selected carrier.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of example communication device 100 in an operating environment within which the features of the present disclosure are advantageously implemented. In the illustrated embodiment, communication device 100, managed by controller 101, includes eSIM 102 that receives eSIM profile 104. Controller 101 uses carrier information in eSIM profile 104 to enable communication with radio access network(s) (RAN) 106 operated by a selected carrier 108a of more than one carrier 108a-108z. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Communication device 100 can be a machine to machine (M2M) device that communicates via an over-the-air (OTA) channel, such as a wireless connection or mobile telephony channel. Communication device 100 can be part of an Internet of Things (IoT) infrastructure. These various devices all provide and/or include the necessary hardware and software to support the various wireless or wired communication functions as part of a communication system. Communication device 100 can be intended to be portable, hand-held, wearable, detachable, positioned in a fixed location, or mounted to a movable vehicle.

Referring now to the specific component makeup and the associated functionality of the presented components. In one or more embodiments, communication device 100 includes over-the-air (OTA) communication subsystem 107, data storage subsystem 109, input/output subsystem 110, and motion sensor subsystem 111 that are managed by controller 101. OTA communication subsystem 107 includes antenna subsystem 112 having receive antennas 113a-113n and transmit antennas 114a-114m. OTA communication subsystem 107 includes RF frontend 115 having transceiver(s) 116 that includes transmitter(s) 117 and receiver(s) 118. RF frontend 115 further includes modem(s) 119. OTA communication subsystem 107 includes communication module 120 that is setup with carrier configuration 122, mobile country code (MCC) 123 and mobile network code (MNC) 124 for wireless configuration with external communication system 125. OTA communication subsystem 107 communicates with external OTA communication system 125. External OTA communication system 125 can include devices such as wireless headset 126 and smart watch 127. External OTA communication system 125 can include global positioning system (GPS) satellites 128, base node(s) 129, access node 131, and networks 132. Base node(s) 129 of RANs 106 transmit and receive via radio tower 130. To enable communication device 100 to subscribe for communication services with RAN 106, carrier 108a provides carrier server 133 that hosts subscription manager-data preparation enhanced (SM-DP+) entity 134. To enable communication device 100 to be configured to communicate with RAN 106, original equipment manufacturer (OEM) 136 of communication device 100 provides configuration server 137 that hosts configuration manager 138 to provide digital content 139. The digital content can be used to configure communication device 100 or provide applications to enhance wireless communication via RAN 106.

Data storage subsystem 109 of communication device 100 includes removable storage device(s) (RSD(s)) 140, which is received in RSD interface 141. Controller 101 is communicatively connected, via system interlink 142 and RSD interface (I/F) 141, to RSD 140. In one or more embodiments, removable storage device (RSD) 140 is a computer program product or computer readable storage device, which can be referred to as non-transitory. RSD 140 can be accessed by controller 101 to provision communication device 100 with program code. When executed by controller 101, the program code causes or configures communication device 100 to provide the functionality described herein. Embedded subscriber identity module (eSIM) 102 is a dedicated data storage component that is encrypted and physically separate from other components of data storage subsystem 109. eSIM 102 can be provisioned with, or later receive, at least one eSIM profile 104. Other data structures and content can be stored in eSIM profile 104, such as eSIM profile user interface (UI) 143 that lists at least one stored eSIM profile 104 for user selection via input/output subsystem 110.

I/O subsystem 110 includes image capturing device 144 and proximity sensor 145. I/O subsystem 110 also includes user interface device(s) 147 having touch/haptic controls 148 and display 150. I/O subsystem 110 also includes microphone 151, range finder 152, and audio output device 153. I/O subsystem 110 also includes I/O controller 154, which connects to peripheral devices 155 external to housing 156 of communication device 100. I/O controller 154 can provide drive signals and receive sensor readings in formats compatible with peripheral device 155. I/O controller 154 can act as a communication interface for peripheral device 155. In one or more embodiments, peripheral device(s) 155 include data storage such as a universal serial bus (USB) memory device. In one or more embodiments, I/O subsystem 110 includes network interface controller (NIC) 157 with a network connection (NC) 158 on housing 156. Network cable 159 connects NC 158 to a wired area network 160. Wired area network 160 can be a local area network (LAN), a campus area network (CAN), a metropolitan area network (MAN), or a wide area network (WAN). For example, NC 158 can be an Ethernet connection. A remote user interface (UI) 161 is communicatively coupled to wired area network 160.

Controller 101 controls the various functions and/or operations of electronic device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 164, which includes one or more central processing units (CPUs), depicted as data processor 165, that are communicatively coupled, via system interlink 142, to device memory 166. Processor subsystem 164 can include one or more digital signal processors 167 that are integrated with data processor 165 or are communicatively coupled, via system interlink 142, to data processor 165. Device memory 166 includes applications such as communication application 168, device configuration agent 169, local profile assistant (LPA) application 170, and other application(s) 171. Device memory 166 further includes operating system (OS) 172, firmware interface (I/F) 173, such as basic input/output system (BIOS) or Uniform Extensible Firmware Interface (UEFI), and other firmware 174. Device memory 166 includes data 175 used by LPA application 170 and other application(s) 171. Processor subsystem 164 of controller 101 executes program code to provide operating functionality of communication device 100. These software and/or firmware modules have varying functionality when their corresponding program code is executed by processor subsystem 164 or secondary processing devices within communication device 100. Processor subsystem 164 of controller 101 can execute program code of LPA application 170 to at least partially implement concurrently eSIM profile 104 in eSIM 102 and non-eSIM, device-specific digital content 139. The implementation supports communication by communication device 100 via a new carrier 108a-108z. The at least partially concurrent implementation includes respective downloading and installing of eSIM profile 104 in eSIM 102 and non-ESIM device-specific digital content 139 in device memory 166 of communication device 100.

In one or more embodiments, controller 101 of communication device 100 is communicatively coupled via system interlink 142 to OTA communication subsystem 107, data storage subsystem 109, input/output subsystem 110, and motion sensor subsystem 111. System interlink 142 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 142) are illustrated in FIG. 1, it is to be understood that more, fewer, or different interconnections may be present in other embodiments.

Communication module 120 of OTA communication subsystem 107 operates in baseband frequency range to encode data for transmission and decode received data, according to a communication protocol. Modem(s) 119 modulate baseband encoded data from communication module 120 onto a carrier signal to provide a transmit signal that is amplified by transmitter(s) 117. Modem(s) 119 demodulates the received signal from base node(s) 129 or the received signal from access node 131. The received signal is detected by antenna subsystem 112. The received signal is amplified and filtered by receiver(s) 118, which demodulate received encoded data from a received carrier signal. In one or more embodiments, antenna subsystem 112 includes transmit antennas 114a-114m and receive antennas 113a-113n that are individually tuned to selected RF bands to support different RF communication bands and protocols. In one or more embodiments, a plurality of antennas from among transmit antennas 114a-114m and receive antennas 113a-113n can be used in combination for multiple input, multiple output (MIMO) operation for beam steering and spatial diversity.

In one or more embodiments, controller 101, via OTA communication subsystem 107, performs multiple types of OTA communication with external OTA communication system 125. OTA communication subsystem 107 can communicate via Bluetooth connection with one or more personal access network (PAN) devices, such as wireless headset 126 and smart watch 127. Communication via Bluetooth connection includes both transmission and reception via a Bluetooth transceiver device. In one or more embodiments, OTA communication subsystem 107 communicates with one or more locally networked devices via a wireless local area network (WLAN) link provided by access node 131. Access node 131 is connected to wide area network 132, such as the Internet. In one or more embodiments, OTA communication subsystem 107 communicates with GPS satellites 128 to obtain geospatial location information. In one or more embodiments, OTA communication subsystem 107 communicates with RANs 106 having respective base stations (BSs) or base node(s) 129. RANs 106 are a part of a wireless wide area network (WWAN) 177. WWAN 177 is connected to wide area network 132.

Data storage subsystem 109 provides nonvolatile storage that is accessible by controller 101. For example, data storage subsystem 109 can provide a large selection of other applications 171 that can be loaded into device memory 166. In one or more embodiments, local data storage device(s) 146 includes hard disk drives (HDDs), optical disk drives, solid state drives (SSDs), etc.

Axes-based motion sensor subsystem 111 includes one or more sensors that individually, or in combination, indicate orientation and motion of communication device 100. In one or more embodiments, gravity sensor 178 can be used to measure relative orientation with respect to the Earth's gravitational field. Magnetometer 179 is configured to measure strength and direction of a magnetic field relative to the magnetic geographic cardinal coordinates north, south, east, and west. Gyroscope 180 is configured to generate and provide sensor data that indicates orientation of communication device 100 along the three X-Y-Z axes based on rotation or angular momentum of communication device 100 around the multiple axes. Three-axis accelerometer 181 is configured to generate and provide sensor data that indicates acceleration that communication device 100 is experiencing relative to freefall. The acceleration indication can be used to determine orientation of electronic device 100 along the three axes, based on linear motion and gravity. Gravity sensor 178, magnetometer 179, gyroscope 180, and accelerometer 181 can be used alone or in combination to determine the relative orientation of communication device 100 in space. The relative orientation can include azimuth, pitch, and roll with respect to magnetic north and with respect to the horizontal and vertical axes relative to the direction of gravity.

According to aspects of the present disclosure, communication device 100 supports deployment of carrier configuration from OEM 136 in parallel (or concurrently) with installation of eSIM profile 104. Communication device 100 receives carrier destination data 182 providing a carrier designation that identifies a source of eSIM profile 104. In one or more embodiments, communication device 100 receives carrier destination data 182 as informational image 183 via image capturing device 144. Examples of informational image 183 include a one or two dimensional barcode image (e.g., QR matrix barcode) that is encoded with carrier destination data 182 or an alphanumeric printed advertisement that can be machine read by optical character recognition (OCR). In one or more embodiments, communication device 100 receives carrier destination data 182 via user input to user interface device 147, such as by recognizing voice, touch, or gesture. In one or more embodiments, communication device 100 receives carrier destination data 182 via a wireless downlink from network 132. In one or more embodiments, communication device 100 receives carrier destination data 182 via NIC 157 and LAN 160, from remote UI 161. In one or more embodiments, communication device 100 receives carrier destination data 182 via peripheral device(s) 155. In one or more embodiments, communication device 100 receives/retrieves carrier destination data 182 that is stored on RSD 140.

In response to receiving the carrier destination data, controller 101 executes LPA application 170 to enable communication device 100 to identify selected carrier 108*a* based on carrier destination data 182. Each carrier 108*a*-108*z* is identified via separate carrier designation data 182. LPA application 170 requests download, via a network interface, of eSIM profile 104 associated with selected carrier 108*a* from a subscription or carrier server 133, based on the identified carrier destination. In one or more embodiments, the network interface is provided by OTA communication between OTA communication subsystem 107 and external OTA communication system 125, such as base node 129 or access node 131. The identified carrier destination can be a network address such as universal resource locator (URL). LPA application 170, via OTA communication subsystem 107, receives eSIM profile 104 and installs eSIM profile 104 in eSIM 102. With eSIM profile 104 and eSIM profile UI list 143 stored in eSIM 102, controller 101 can present eSIM profile UI list 143 via user interface device 147 for user selection. For example, display 150 can present eSIM profile UI list control 184.

According to one aspect of the disclosure, LPA application 170 shortens the time required to configure or further equip communication device 100 to use eSIM profile 104. Concurrently with one or more of requesting, receiving and installing eSIM profile 104, LPA application 170 receives, via OTA communication subsystem 107, digital content 139. Digital content 139 can be one or more of configuration data and application software. In one or more embodiments, digital content 139 can be required for communication device 100 to communicate with RAN 106 via OTA communication subsystem 107. For example, carrier configuration can be implemented. The carrier configuration can include a modem binary configuration (MBN). The carrier configuration can include an updated access point name (APN) in extended markup language (xml). In one or more embodiments, digital content 139 can add optional functionality such as extension provisioning to device memory 166 for use by controller 101. Digital content 139 can be an application that is associated by OS 172 with files having a particular extension. LPA application 170 can identify selected carrier 108*a* and the current hardware/software configuration of communication device 100. LPA application 170 transmits the information to configuration server 137. Configuration manager 138 hosted on configuration server 137 associates selected carrier 108*a* and configuration of the communication device 100 with digital content 139 from configuration manager 138 hosted on configuration server 137. In one or more embodiments, LPA application 170 is assisted by device configuration agent 169, executed by controller 101. Device configuration agent 169 communicates a current configuration of communication device 100 with configuration manager 138. Device configuration agent 169 manages receiving digital content 139 from configuration server 137. Device configuration agent 169 installs digital content 139 in device memory 166 and communication module 120.

In one or more embodiments, LPA application 170 is implemented to conform to standards of the Global Certification Forum (GCF), which is an active partnership between mobile network operators, mobile device manufacturers, and the test industry. GCF was founded in 1999, and its membership has been responsible for creating an independent certification program to help ensure global interoperability between mobile devices and networks. The GCF certification process is based on technical requirements as specified within dedicated test specifications provided by the 3rd Generation Partnership Project (3GPP), The 3rd Generation Partnership Project 2 (3GPP2), Open Mobile Association (OMA), International Multimedia Telecommunications Consortium (IMTC), the Global System for Mobile Communications (GSM) Association, and others.

Figure 2:
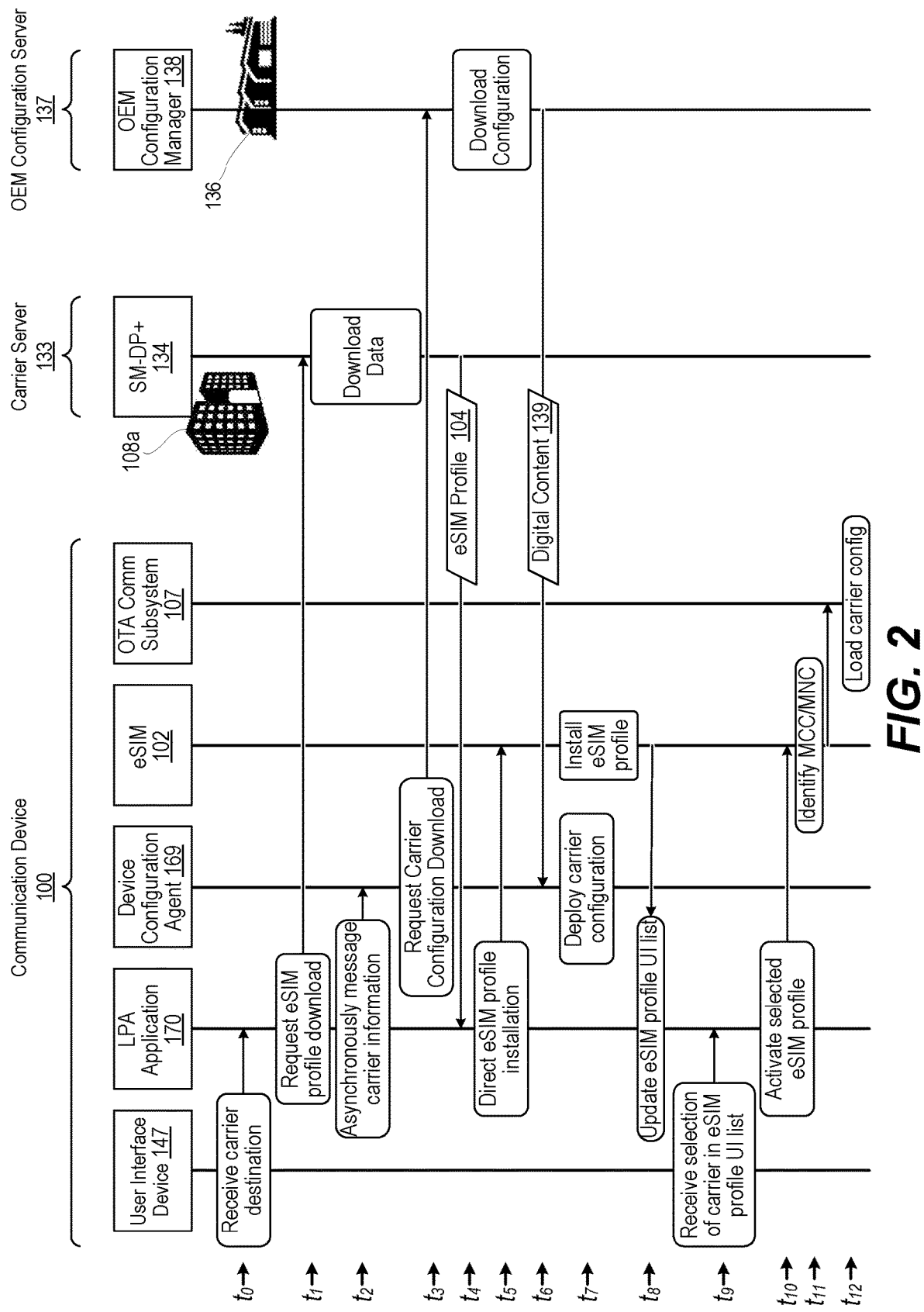
FIG. 2 is a timing diagram of at least partially concurrent interactions between the communication device, a carrier server provided by a carrier, and a configuration server provided by an original equipment manufacturer (OEM), according to one or more embodiments.

FIG. 2 depicts a timing diagram 200 of concurrent interactions between communication device 100, carrier server 133 provided by carrier 108a, and configuration server 137 provided by OEM 136. In one or more embodiments, at time $t_0$, user interface device 147 receives carrier destination data and transmits identity of carrier destination to LPA application 170. For example, carrier destination data can be graphical data that requires decoding to identify the carrier destination in terms of alphanumeric or binary data. At time $t_1$, LPA application 170 requests eSIM profile from SM-DP+ entity 134 hosted by carrier server 133. SM-DP+ entity 134 begins downloading data for eSIM profile. The eSIM profile includes carrier designation information necessary for OTA communication via carrier 108a, such as MNC 124. At time $t_2$, LPA application 170 asynchronously messages carrier information to device configuration agent 169. At time $t_3$, device configuration agent 169 requests carrier configuration download from OEM configuration server 137. OEM configuration manager 138 begins download of configuration. At time $t_4$, LPA application 170 completes receiving eSIM profile 104 from SM-DP+ entity 134. At time $t_5$, LPA application 170 directs installation of eSIM profile on eSIM 102. LPA application 170 supervises installation of eSIM profile 104 (FIG. 1) in eSIM 102. At time $t_6$, device configuration agent 169 receives digital content 139 from OEM configuration manager 138. At time $t_7$, device configuration agent 169 manages deployment of carrier configuration in device memory 166 (FIG. 1) of communication device 100. At time $t_8$, LPA application 170 confirms completion of installation of eSIM profile in eSIM 102 by requesting and receiving an update to eSIM profile UI list from eSIM 102. At time $t_9$, user interface device 147 receives user input indicating selection of a carrier in eSIM profile UI list. In response, user interface device 147 transmits the identity of the carrier to LPA application 170. At time $t_{10}$, LPA application 170 activates the selected eSIM profile 104 in eSIM 102. At time $t_{11}$, eSIM 102 identifies MCC 123 and MNC 124 for a selected carrier to OTA communication subsystem 107. At time $t_{12}$, OTA communication subsystem 107 loads carrier configuration to support voice and/or data wireless communication via RAN(s) 106 provided by carrier 108a. Then timing diagram 200 ends.

Figure 3:
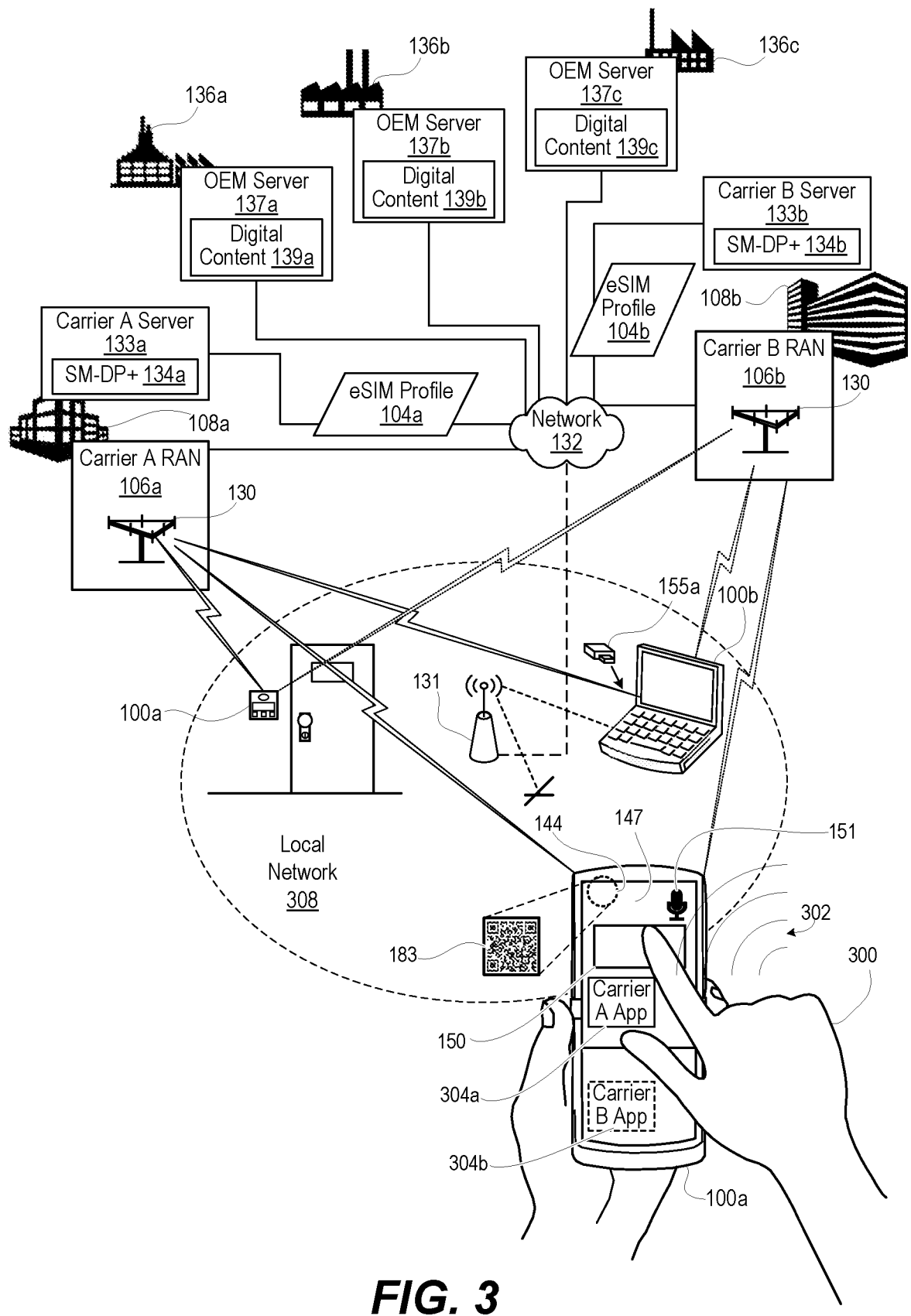
FIG. 3 is a functional communication diagram of three communication devices that are concurrently updated with eSIM profiles to change carrier service to another carrier, according to one or more embodiments.

FIG. 3 depicts communication devices 100a-100c that are concurrently updated with eSIM profiles 104 to change carrier service by RANs 106a provided by carrier 108a to RANs 106b provided by carrier 108b. Carriers 108a-108b can own, lease, or arrange for nonexclusive use of radio towers 130 that support RANs 106a-106b. Carrier 108a provides eSIM profile 104a via SM-DP+ entity 134a hosted by carrier server 133a for subscribing to telephony services by carrier 108a. Carrier 108b provides eSIM profile 104b via SM-DP+ entity 134b hosted by carrier "B" server 133b for subscribing to telephony services by carrier 108b.

In one or more embodiments, communication device 100a is a smartphone or similar mobile device that is manually controlled by user 300 via image capturing device 144, user interface device 147, and/or microphone 151. In one or more embodiments, user 300 positions communication device 100a to recognize informational image 183 to receive carrier destination data. In one or more embodiments, user 300 speaks, into microphone 151 of communication device 100a, vocal information 302 that indicates carrier destination data. In one or more embodiments, user 300 interacts with display 150 by touch to communicate carrier destination data, such as spelling out a hyperlinked address. User interface device 147 also provides affordances 304a-304b for activating digital content, such as carrier "A" application 206a and carrier "B" application 306b, which are respectively associated with carriers 108a-108b. Communication device 100a is capable of wireless communication with RANs 106a-106b. Communication device 100a is capable of wireless communication with access node 131. In one or more embodiments, communication device 100a can obtain eSIM profile 104 via a currently supported RAN 106a or access node 131.

In one or more embodiments, communication devices 100a-100c are independently updated to new carrier service by carrier 108b. For example, communication device 100b is a workstation, laptop, or other portable or fixed device that can receive carrier destination data via a peripheral device, depicted as a USB memory device 155a. In one or more embodiments, communication device 100a initiates eSIM profile 104 download and activation for other communication devices 100b-100c. For example, communication device 100c is an M2M device without a local user interface. A user of communication device 100a, via user interface device 147, initiates eSIM profile 104 download and activation for communication devices 100c. In one or more embodiments, all communication devices 100a-100c can be commonly managed, such as being part of LAN 308, with each communication device 100a-100c being made by a respective one of OEMs 136a-136c. In one or more embodiments, LAN 308 is communicatively coupled to OEM configuration servers 137a-137c provided respectively by OEMs 136a-136c.

Figure 4A:
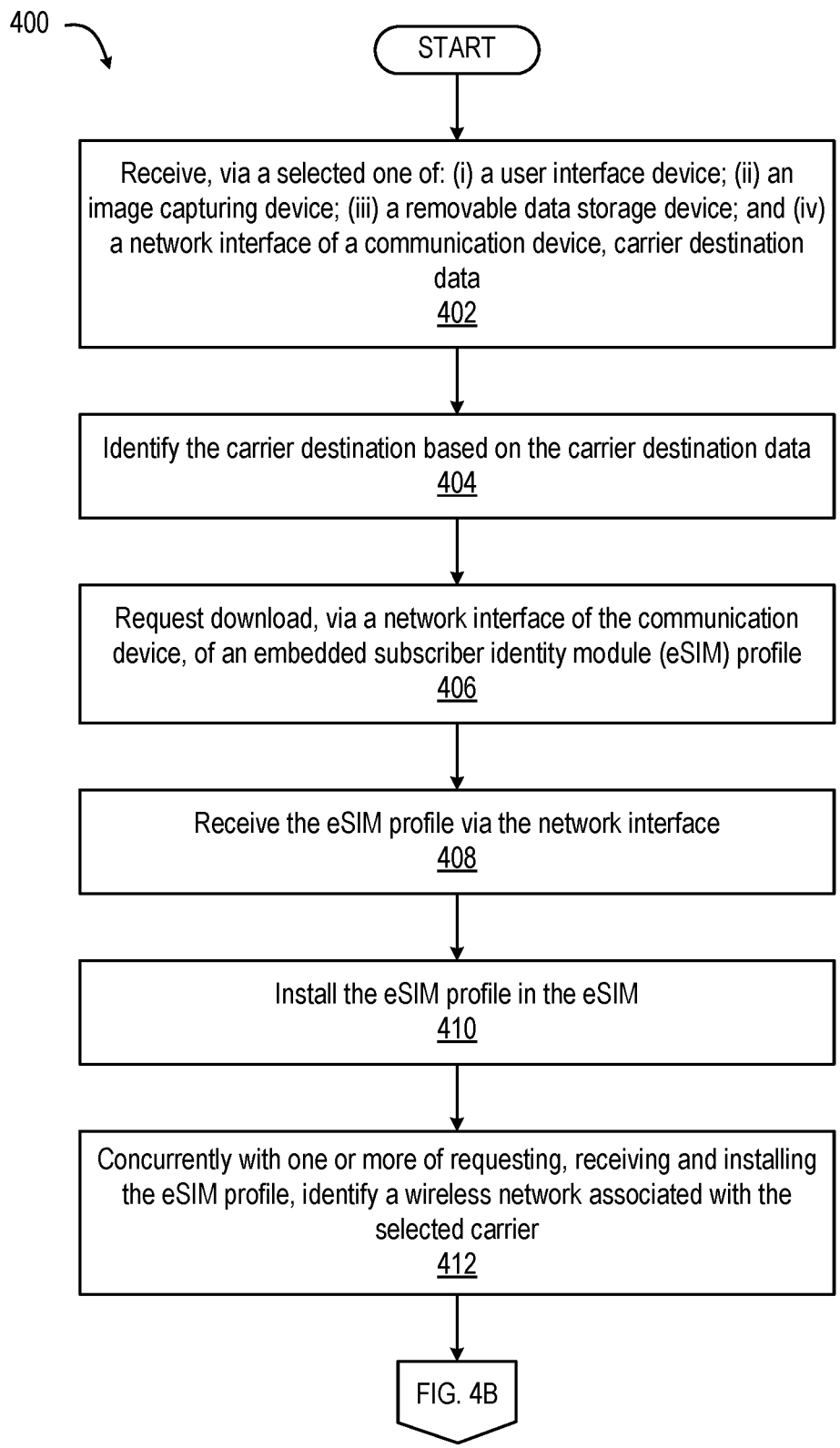
FIGS. 4A-4B (FIG. 4) present a flow diagram of a method for non-sequentially updating an eSIM with an eSIM profile and device memory with non-eSIM, device-specific digital content, according to one or more embodiments.
Figure 4B:
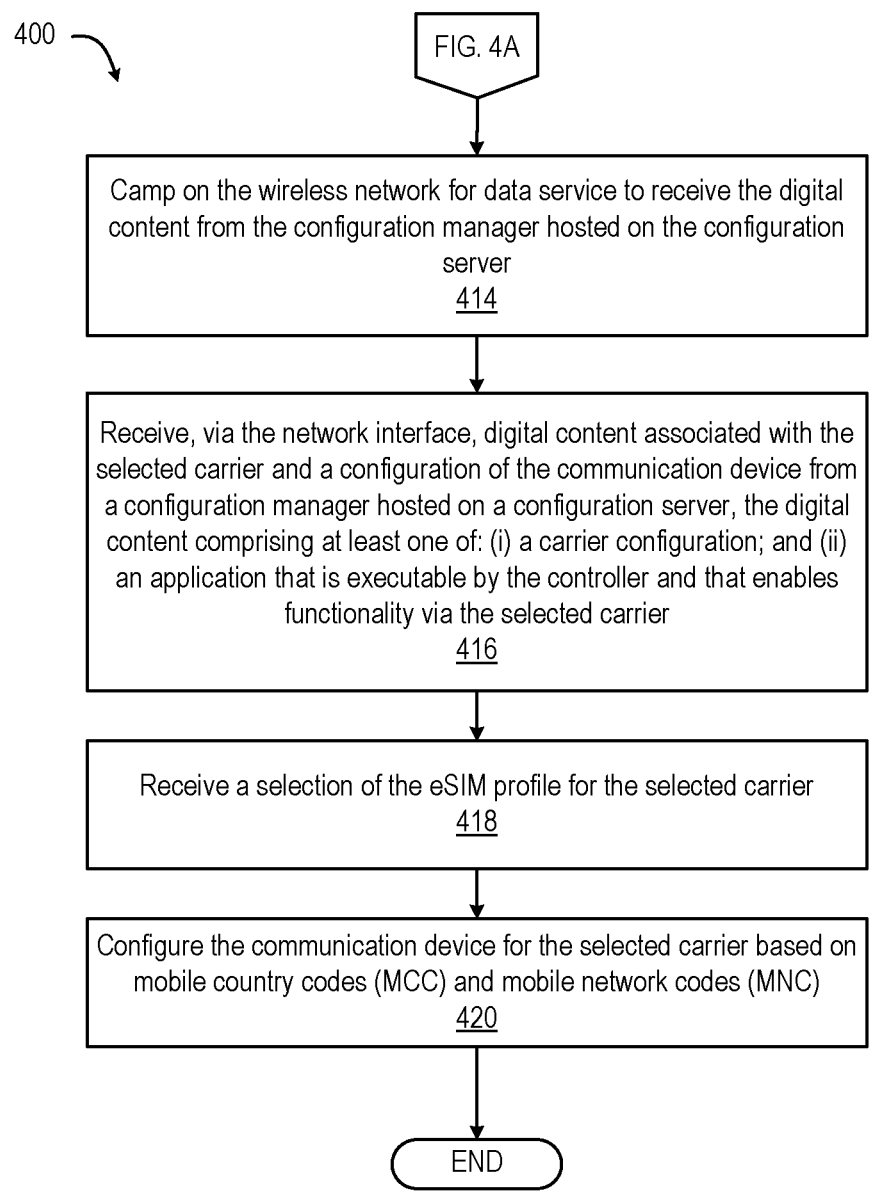

FIGS. 4A-4B (FIG. 4) present a flow diagram of a method for at least partially implementing concurrently an embedded subscriber identity module (eSIM) and non-eSIM, device-specific digital content. The implementation supports communication by the communication device via a new carrier. The description of method 400 is provided with general reference to the specific components illustrated within the preceding FIGS. 1-3. In at least one embodiment, method 400 can be implemented using controller 101 (FIG. 1) that executes LPA application 170 (FIG. 1) to enable communication device 100 (FIG. 1) to perform method 400. With reference to FIG. 4A, method 400 includes receiving, via a selected one of: (i) a user interface device; (ii) an image capturing device; (iii) a removable data storage device; and (iv) a network interface of a communication device, carrier destination data (block 402). Method 400 includes identifying the carrier destination based on the carrier destination data (block 404). Method 400 includes requesting download, via a network interface of the communication device, of an embedded subscriber identity module (eSIM) profile (block 406). The eSIM profile is associated with a selected carrier and is requested from an associated subscription server based on the identified carrier destination. In one or more embodiments, subscription server hosts a server manager-data preparation enhanced (SM-DP+) entity. Method 400 includes receiving the eSIM profile via the network interface (block 408). Method 400 includes installing the eSIM profile in the eSIM (block 410). Concurrently with one or more of requesting, receiving and installing the eSIM profile from the subscription server, method 400 includes identifying a wireless network associated with the selected carrier (block 412).

With reference to FIG. 4B, method 400 includes camping on the wireless network for data service to receive digital content from the configuration manager hosted on an OEM configuration server (block 414). Method 400 includes receiving, via the network interface, digital content associated with the selected carrier and a configuration of the communication device from a configuration manager hosted on the OEM configuration server (block 416). The digital content includes at least one of: (i) a carrier configuration; and (ii) an application that is executable by the controller and that enables functionality via the selected carrier. Method 400 includes receiving a selection of the eSIM profile for the selected carrier (block 418). Method 400 includes configuring the communication device for the selected carrier based on mobile country codes (MCC) and mobile network codes (MNC) (block 420). Then method 400 ends.

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    a radio frequency (RF) frontend that is configurable for over the air (OTA) communication with at least one radio access network (RAN) operated by a selected carrier from among more than one carrier;
    an embedded subscriber identity module (eSIM) that stores one or more eSIM profiles that enable the RF frontend to communication with the at least one RAN operated by the selected carrier;
    a memory that stores a local profile assistant (LPA) application;
    a network interface that communicates with one or more network servers via wireless communication;
    a controller communicatively coupled to the RF frontend, the eSIM, the memory, and the network interface, the controller executing the LPA application to enable the communication device to:
        receive, via a selected one of: (i) a user interface device; (ii) an image capturing device; (iii) a removable data storage device; and (iv) the network interface, carrier destination data providing a carrier designation; and
        in response to receiving the carrier destination data:
            identify the selected carrier based on the carrier destination data, each carrier of the more than one carrier identified via separate carrier designation data;
            request download, via the network interface, of an eSIM profile associated with the selected carrier from a subscription server based on the identified carrier destination;
            receive the eSIM profile via the network interface;
            install the eSIM profile in the eSIM; and
                concurrent with one or more of requesting, receiving and installing the eSIM profile: receive, via the network interface, digital content associated with the selected carrier and a configuration of the communication device from a configuration manager hosted on a configuration server, the digital content enabling functionality via the selected carrier.

2. The communication device of claim 1, wherein, concurrently with the one or more of requesting, receiving and installing the eSIM profile from the subscription server comprising a server manager-data preparation enhanced (SM-DP+) entity to enable cellular voice service, the controller further executes the LPA application to enable the communication device to:
   identify a wireless network associated with the selected carrier; and
   camp on the wireless network for data service to receive the digital content from the configuration manager hosted on the configuration server.

3. The communication device of claim 1, further comprising a user interface, wherein the controller executes the LPA application to enable the communication device to:
   monitor the user interface for a selection of the eSIM profile for the selected carrier; and
   in response to receiving the selection of the eSIM profile for the selected carrier, configure the communication device for the selected carrier based on mobile country codes (MCC) and mobile network codes (MNC).

4. The communication device of claim 1, further comprising an image capturing device that images a graphical indicator of digital information to obtain the carrier destination data.

5. The communication device of claim 1, further comprising a user interface device that receives the carrier destination data.

6. The communication device of claim 1, further comprising a removable data storage device that stores the carrier destination data.

7. The communication device of claim 1, wherein the controller executing the LPA application further enables the communication device to receive, via the network interface, the carrier destination data from a remote user interface.

8. The communication device of claim 1, wherein the controller executing the LPA application further enables the communication device to install the digital content comprising at least one of: (i) a carrier configuration; and (ii) an application executable by the controller.

9. A method comprising:
   receiving, via a selected one of: (i) a user interface device; (ii) an image capturing device; (iii) a removable data storage device; and (iv) a network interface of a communication device, carrier destination data; and
   in response to determining that carrier destination data is received:
      identifying the carrier destination based on the carrier destination data;
      requesting download, via a network interface of the communication device, of an embedded subscriber identity module (eSIM) profile associated with a selected carrier from a subscription server based on the identified carrier destination;
      receiving the eSIM profile via the network interface;
      installing the eSIM profile in the eSIM; and
      concurrent with one or more of requesting, receiving and installing the eSIM profile, receiving, via the network interface, digital content associated with the selected carrier and a configuration of the communication device from a configuration manager hosted on a configuration server, the digital content that enables functionality via the selected carrier.

10. The method of claim 9, wherein, concurrently with the one or more of requesting, receiving and installing the eSIM profile from the subscription server comprising a server manager-data preparation enhanced (SM-DP+) entity to enable cellular voice service, the method further comprises:
    identifying a wireless network associated with the selected carrier; and
    camping on the wireless network for data service to receive the digital content from the configuration manager hosted on the configuration server.

11. The method of claim 9, further comprising:
    monitoring a user interface device for a selection of the eSIM profile for the selected carrier; and
    in response to receiving the selection of the eSIM profile for the selected carrier, configuring the communication device for the selected carrier based on mobile country codes (MCC) and mobile network codes (MNC).

12. The method of claim 9, further comprising receiving, via an image capturing device, an image of a graphical indicator comprising the carrier destination data.

13. The method of claim 9, further comprising receiving, via a user interface device of the communication device, the carrier destination data.

14. The method of claim 9, receiving, via a removable storage device, the carrier destination data.

15. The method of claim 9, further comprising receiving, via the network interface, the carrier destination data from a remote user interface.

16. The method of claim 9, wherein installing the digital content comprises installing at least one of: (i) a carrier configuration; and (ii) an application executable by the controller.

17. A computer program product comprising:
    a computer readable storage device; and
    program code on the computer readable storage device that when executed by a processor associated with a communication device having a radio frequency (RF) frontend, an embedded subscriber identity module (eSIM), and a network interface, the program code enables the communication device to provide local profile assistant functionality of:
    receiving, via a selected one of: (i) a user interface device; (ii) an image capturing device; (iii) a removable data storage device; and (iv) a network interface of a communication device, carrier destination data; and
    in response to determining that carrier destination data is received:
       identifying the carrier destination based on the carrier destination data;
       requesting download, via a network interface of the communication device, of an eSIM profile associated with a selected carrier from a subscription server based on the identified carrier destination;
       receiving the eSIM profile via the network interface;
       installing the eSIM profile in the eSIM; and
       concurrent with one or more of requesting, receiving and installing the eSIM profile, receiving, via the network interface, digital content associated with the selected carrier and a configuration of the communication device from a configuration manager hosted on a configuration server, the digital content that enables functionality via the selected carrier.

18. The computer program product of claim 17, wherein the program code enables the communication device to provide the functionality of:

concurrently with the one or more of requesting, receiving and installing the eSIM profile from the subscription server comprising a server manager-data preparation enhanced (SM-DP+) entity to enable cellular voice service:
- identifying a wireless network associated with the selected carrier; and
- camping on the wireless network for data service to request and receive the digital content from the configuration manager hosted on the configuration server.

19. The computer program product of claim 17, wherein the program code enables the communication device to provide the functionality of:
- monitoring a user interface device for a selection of the eSIM profile for the selected carrier; and
- in response to receiving the selection of the eSIM profile for the selected carrier, configuring the communication device for the selected carrier based on mobile country codes (MCC) and mobile network codes (MNC).

20. The computer program product of claim 17, wherein the program code enables the communication device to provide the functionality of installing the digital content comprising installing at least one of: (i) a carrier configuration; and (ii) an application executable by the controller.

* * * * *